United States Patent
Bortone

(10) Patent No.: US 6,607,772 B1
(45) Date of Patent: Aug. 19, 2003

(54) METHOD AND APPARATUS FOR PRODUCING A BRAIDED PUFF EXTRUDATE

(75) Inventor: Eugenio Bortone, Frisco, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 10/071,904

(22) Filed: Feb. 8, 2002

(51) Int. Cl.[7] .............................. A21D 6/00; A23P 1/00
(52) U.S. Cl. ...................... 426/516; 99/472; 425/382.3; 426/500
(58) Field of Search ................................ 426/496, 516, 426/500, 501, 518; 425/133.1, 382.3, 382 R; 99/472

(56) References Cited

U.S. PATENT DOCUMENTS

| | | | |
|---|---|---|---|
| 3,327,461 A | 6/1967 | Wyatt | |
| 4,288,463 A | * 9/1981 | Groff et al. | 426/500 |
| 4,879,126 A | 11/1989 | Willard et al. | |
| 5,246,651 A | 9/1993 | Hentschel | |
| 5,266,260 A | 11/1993 | Hentschel | |
| 5,637,341 A | * 6/1997 | Rivlin | 426/516 |
| 5,670,185 A | 9/1997 | Heck et al. | |
| 6,428,830 B1 | 8/2002 | Matthews et al. | |

FOREIGN PATENT DOCUMENTS

JP  62029936 A  2/1987

* cited by examiner

*Primary Examiner*—George C. Yeung
(74) *Attorney, Agent, or Firm*—Colin P. Cahoon; Carstens, Yee & Cahoon, L.L.P.

(57) ABSTRACT

A process and apparatus for the production of a braid shaped puffed extrudate. A tube or other peripheral containment vessel is placed at the exit end of an extruder die that produces two or more extrudate streams. A circular air stream is then introduced into the peripheral containment vessel downstream of the glass transition point, thereby causing the extrudate streams to braid together within the containment vessel.

20 Claims, 2 Drawing Sheets

METHOD AND APPARATUS FOR PRODUCING A BRAIDED PUFF EXTRUDATE

BACKGROUND OF THE INVENTION

1. Technical Field

The present invention relates to the production of a braided shaped puff extrudate and, in particular, to confining two or more streams of extrudate in a tube or like peripheral containment vessel while introducing a gas flow that creates a turbine effect or circular air flow inside the containment vessel, thereby twisting the two or more streams of extrudate into a single braided product.

2. Description of Related Art

The production in the prior art of a puffed extruded product, such as snacks produced and marketed under the Cheetos™ brand label, typically involves extruding a corn meal or other dough through a die having a small orifice at extremely high pressure. The dough flashes or puffs as it exits the small orifice, thereby forming a puff extrudate. The typical ingredients for the starting dough may be, for example, corn meal of 41 pounds per cubic foot bulk density and 12 to 13.5% water content by weight. However, the starting dough can be based primarily on wheat flour, rice flour, soy isolate, soy concentrates, any other cereal flours, protein flour, or fortified flour, along with additives that might include lecithin, oil, salt, sugar, vitamin mix, soluble fibers, and insoluble fibers. The mix typically comprises a particle size of 100 to 1200 microns.

The puff extrusion process is illustrated in FIG. 1, which is a schematic cross-section of a die 12 having a small diameter exit orifice 14. In manufacturing a corn-based puffed product, corn meal is added to, typically, a single (i.e., American Extrusion, Wenger, Maddox) or twin (i.e., Wenger, Clextral, Buhler) screw-type extruder such as a model X 25 manufactured by Wenger or BC45 manufactured by Clextral of the United States and France, respectively. Using a Cheetos like example, water is added to the corn meal while in the extruder, which is operated at a screw speed of 100 to 1000 RPM, in order to bring the overall water content of the meal up to 15% to 18%. The meal becomes a viscous melt 10 as it approaches the die 12 and is then forced through a very small opening or orifice 14 in the die 12. The diameter of the orifice 14 typically ranges between 2.0 mm and 12.0 mm for a corn meal formulation at conventional moisture content, throughput rate, and desired extrudate rod diameter or shape. However, the orifice diameter might be substantially smaller or larger for other types of extrudate materials.

While inside this small opening 14, the viscous melt 10 is subjected to high pressure and temperature, such as 600 to 3000 psi and approximately 400° F. Consequently, while inside the small orifice 14, the viscous melt 10 exhibits a plastic melt phenomenon wherein the fluidity of the melt 10 increases as it flows through the die 12.

It can be seen that as the extrudate 16 exits the orifice 14, it rapidly expands, cools, and very quickly goes from the plastic melt stage to a glass transition stage, becoming a relatively rigid structure, referred to as a "rod" shape if cylindrical, puffed extrudate. This rigid rod structure can then be cut into small pieces, further cooked by, for example, frying, and seasoned as required.

Any number of individual dies 12 can be combined on an extruder face in order to maximize the total throughput on any one extruder. For example, when using the twin screw extruder and corn meal formulation described above, a typical throughput for a twin extruder having multiple dies is 2,200 lbs., a relatively high volume production of extrudate per hour, although higher throughput rates can be achieved by both single and twin screw extruders. At this throughput rate, the velocity of the extrudate as it exits the die 12 is typically in the range of 1000 to 4000 feet per minute, but is dependent on the extruder throughput, screw speed, orifice diameter, number of orifices and pressure profile.

As can be seen from FIG. 1, the snack food product produced by such process is necessarily a linear extrusion which, even when cut, results in a linear product. Consumer studies have indicated that a product having a similar texture and flavor presented in a braided shape would be desirable. An example of such braided shape of such extrudate is illustrated in FIG. 2, which is a perspective view of one embodiment of a braided shaped puffed extrudate 20. The embodiment illustrated in FIG. 2 consists of two extrudate streams, braided with a relatively loose pitch, minimal diameter, and cut at approximately two turns. It should be understood that when referring to a braided shape or braided extrudate, however, Applicant intends that the pitch (which can be a left hand or right hand pitch), the diameter of the braid curl or spiral, the rod (or other shape) diameter, the number of extrudate streams braided, and piece length can each vary independently to provide a wide variety of products. Unfortunately, the high volume process described above provides unique challenges in producing such shape 20.

The usual method for imparting a braided shape in an extrudate, such as with braided shaped confectionary, involves imparting twists or curls in the dough using an extruder with rotating nozzles. This process, however, is only viable when the extrudate retains a very pliable form. Further, extrusion by way of rotating nozzles typically requires a greatly reduced throughput rate as compared with the relatively high volume production desirable with the prior art linear products.

To further complicate the matter, a larger surface area is required on the extruder face for the same number of individual dies when extruding a braided product versus a linear product, since the space between each die as between a linear product and a braided product must necessarily be increased to allow for the diameter of the spiral braid. By way of example, an extruder face may under prior art conditions accommodate 28 individual dies running at 80 lbs. per hour per each die, thereby producing a 2,240 lb. per hour throughput for the entire extruder. In order to theoretically produce the braided shaped extrudate 20 shown in FIG. 2, the same extruder face might only accommodate, for example, 4 individual dies. By way of further example, if it is necessary to slow the throughput rate to less than 30 lbs. per hour per die in order to impart some spiral shape on the extrudate by use of a rotating nozzle, this reduces the total throughput for that extruder to only 120 lbs. per hour. Thus, by converting an extruder to braid extrudate by prior art methods (assuming such was even possible and at the extrudate velocity used in this example), the extruder maintains only about 5% of the throughput rate as compared to the standard linear production, even though the throughput for each individual die is reduced to about 38% of the previous throughput rate. The problem becomes even more pronounced if the extrudate throughput is reduced to even lower levels, which would be required if some type of rotating nozzle could possibly be made to function for such a product.

It can be easily understood that any prior art solution that requires the substantial reduction in the throughput of the extrudate, therefore, is not an acceptable alternative when, for example, twenty extruders must be used to match the throughput of a single extruder when compared with a linear production line. Forcing the extrudate streams into some spiral shaped former upon exiting the die is also not practical due to the brittle consistency of the extrudate after it drops below its glass transition temperature. Also, such spiral shaped former could become easily clogged, thereby requiring stopping the entire production line.

Consequently, a need exists for developing a method and apparatus that can impart a braided shape in a puff extrudate while also maintaining an efficient throughput rate of the product through the extruder. Ideally, such invention should be readily adaptable to existing extruders and dies, require little or minimal modification to such equipment, allow for traditional face cutting, and introduce as few collateral processing issues as possible when integrated into the overall production line.

SUMMARY OF THE INVENTION

The proposed invention comprises introducing two or more streams of extrudate as they exit the extruder die into a containment tube or other peripheral containment vessel that is generally axially oriented with the flow path of the extrudate and has a diameter that approximates the intended diameter of the braided end product. A gas is then introduced at one or more points of the containment tube to create a turbine effect or circular air flow within the containment tube. This circular air flow causes the two or more streams of extrudate to braid with each other.

The turbine effect can be accomplished by any number of means. For example, angled holes can be drilled in the containment tube and either a pressure or a vacuum applied through such holes (or both in combination at different locations), either of which need only be of such magnitude as to effect a change in the resistance on the extrudate sufficient to begin the braiding process. Rotating the containment vessel axially about the direction of extrudate flow can also accomplish the same result.

Such a device can be easily fitted to the exit of an extruder die at one end and to a circular extruder face at the other end, thereby allowing for a simple and inexpensive retrofit to existing machinery and allowing for face cutting. Changes in the containment vessel, changes in the velocity of the turbine effect, and changes in other processing parameter can be used to adjust the pitch and diameter of the braid. Economically high throughput rates can be achieved, thus allowing for efficient utilization of existing extruder production lines without requiring additional extruders to maintain line production rates.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 3:
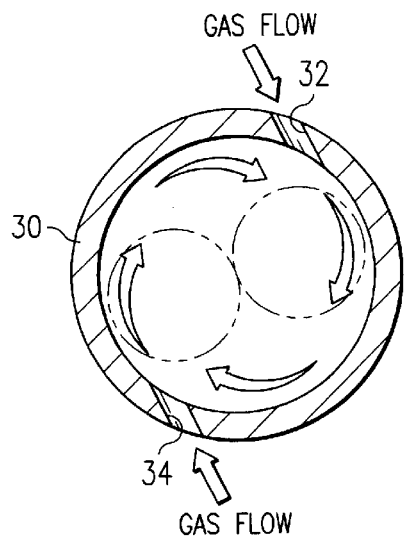
FIG. 3 is a cross-section view in elevation of one embodiment of the present invention.

FIG. 3 is a cross-section of a containment tube 30 showing two orifices or ports 32, 34 that have been drilled through the wall of the containment tube 30 at an angle consistent with the production of the turbine effect necessary for the invention. Specifically, a gas flow (illustrated by arrows and shown as a gas flow into the container vessel, but can also be a gas flow out of the container vessel) travels through the tube ports 32, 34 causing the gas, typically ambient air or nitrogen, to circulate within the containment tube 30. This gas flow acts on two or more extrudate streams (shown in phantom on FIG. 3), thus braiding or twisting the streams together. It should be understood that while there are two ports 32, 34 illustrated in FIG. 3, the invention can comprise one or more orifices, as long as the circular gas flow effect is created. The gas can be introduced (or extracted) from the ports 32, 34 by means of gas fittings and tubes (not shown) fitted to the ports 32, 34 at the exterior of the containment vessel 30, by methods well known in the field of art. It should further be understood that the gas can be injected through a first port and then withdrawn through a second port. Thus, a pressure is introduced at the first port and a vacuum is used on the second port. More than two ports can also be used in such arrangement, as long as the turbine effect is created within the containment tube 30.

Figure 1:
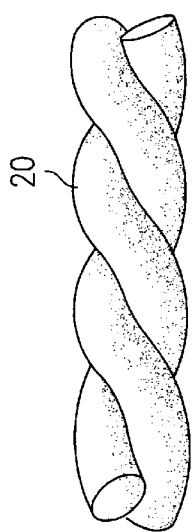
FIG. 1 is a schematic cross-section of a prior art puff extrudate die.
Figure 2:
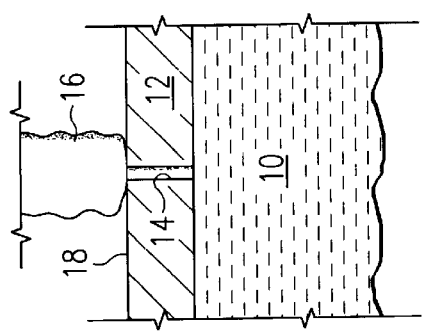
FIG. 2 is a perspective view of one embodiment of the desired puff extrudate product.
Figure 4:
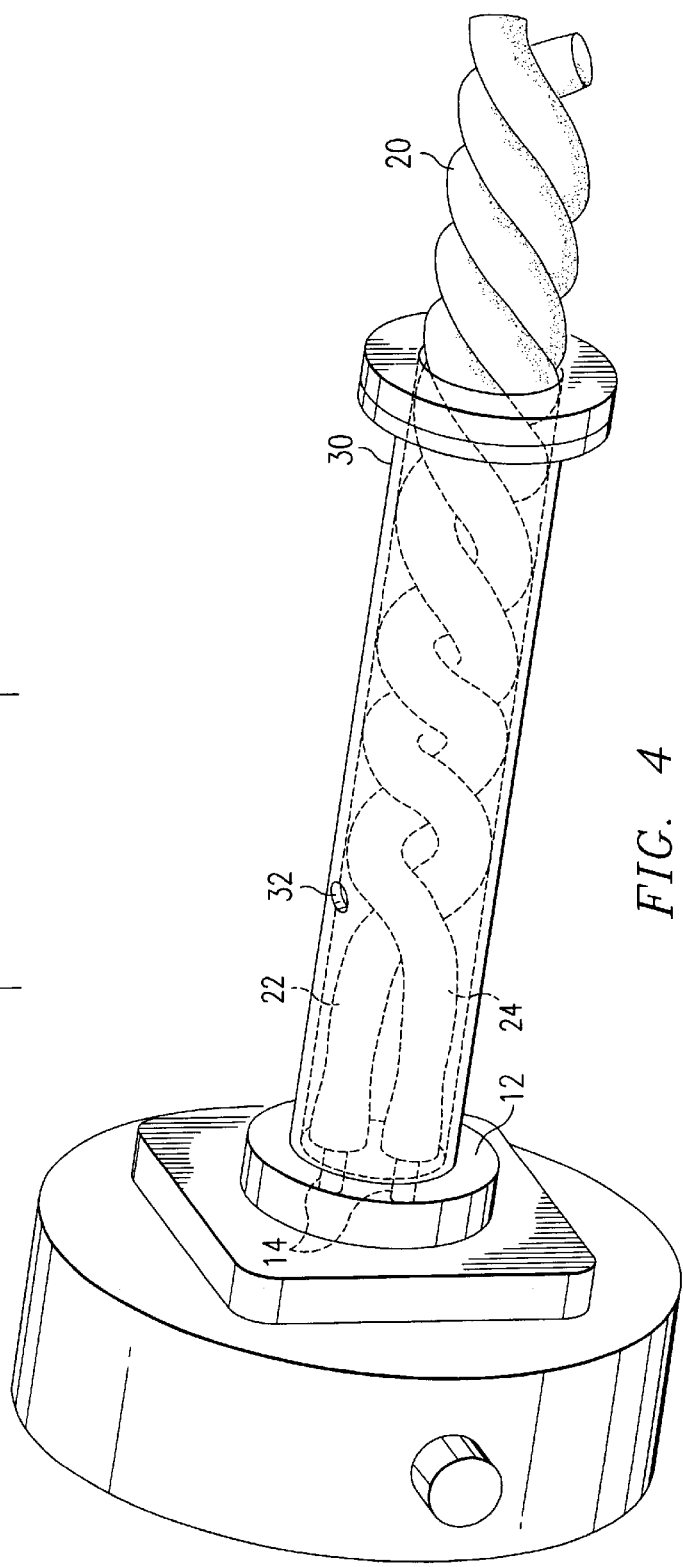
FIG. 4 is a perspective view in elevation of one embodiment of the present invention.

FIG. 4 is a perspective view in elevation of one embodiment of the invention which also shows two extrudate streams 22, 24 in phantom inside the containment tube 30. Corresponding reference numerals are used to represent corresponding elements throughout the figures shown in this application unless otherwise indicated.

The extrudate streams 22, 24 exit two small orifices 14 of the die 12 in the same manner as described in the prior art. Again, the diameter of each orifice 14 is dependent on the specific dough formulation, throughput rate, and desired rod (or other shape) diameter, but is preferred in the range of 1 mm to 14 mm. (The orifice 14 diameter is also dependent on the mean particle size of the corn meal or formula mix being extruded.) The tube 30 is shown centered over the two orifices 14 and axially oriented with the extrudate flow. However, it should be understood that the tube 30 could be off-center from the orifices 14 and canted some degrees from an axial orientation. The tube 30 could also comprise a number of different shapes, such as having a square cross-section. It should also be understood that the orifices 14 need not be circular, but could be any number of shapes, such as star shaped, hexagonal, square, etc . . .

If no force or resistance were applied to extrudate streams 22, 24, they would proceed down the length of the containment tube 30 in a straight rod or linear formation, as with the prior art. However, in the embodiment shown in FIG. 3, one or more gas ports or orifices 32 allow for the introduction of a gas into (and/or extraction therefrom) the interior of the containment tube 30, thereby creating the turbine effect or circular gas flow required to start twisting the extrudate streams 22, 24 in the direction of the circular flow. The one or more gas ports 32 are located at some point downstream of the glass transition point for the extrudate steams 22, 24. As used herein, the glass transition point is that point where the extrudate turns from a liquid or plastic phase to solid or glassy phase after puffing out of the orifice 14, thereby resulting in a relatively brittle end product. The glass transition point is generally very close to the exit of the orifice 14, and is certainly within a few millimeters of such point during the production of the example corn products previously described herein. As the extrudate streams 22, 24 start to twist, a braided product 20 is formed. As a consequence, the linear velocity of the extrudate streams 22, 24 in the direction of tube 30 opening is reduced.

The pitch of the braid can be controlled independently of the extrudate flow rate by adjusting the gas flow applied on the extrudate streams 22, 24. For an embodiment comprising two gas ports 32, 34, such as shown in FIG. 3, of approximately 6 mm diameter, the introduction of air in a pressure range of 10 to 50 psi has been found effective in producing the desired braiding phenomena. Different pressure (and vacuum) ranges are used as appropriate depending on the various extrusion parameters and can be determined for any given product by experimentation.

As with the other embodiments shown, the diameter of the tube 30 can vary depending on the diameter of the braid that is desired. Typically, an inside diameter of the tube 30 between 0.5 inch and 4 inch is preferable. The length of the tube 30 is not critical, as long as it allows for the application of the circular gas flow described sufficiently downstream of the glass transition point to produce the braiding effect. Tubes having an overall length of 0.75 inch to 12 inches have been found to be acceptable.

It should be understood that the various embodiments shown in FIGS. 3 and 4 are provided merely as examples of means by which a downstream turbine effect can be applied to the extrudate streams while such extrudate is bound by a containment tube or other peripheral containment vessel. Any number of shapes of containment vessels can be used, such as a containment vessel having rectangular, square, oval, or triangular sidewalls as opposed to a circular tube.

Regardless of the shape of the containment vessel used, any number of means of inducing the turbine effect can also be used, including the introduction of any physical resistance or any other means to redirect the extrudate stream sufficient to cause the extrudate to braid up inside the containment tube or peripheral containment vessel. Spinning the containment tube axially about the extrudate flow, for example, can create the same turbine effect.

It has been found that traditional throughput rates through existing dies may be maintained using any of the embodiments illustrated and discussed above. In fact, throughput rates in excess of traditional extrusion throughputs, for example in the range of 400 lbs. per hour through a 2.0 mm diameter die, have been achieved while still maintaining the continuous braids flowing from each containment tube. Consequently, a lesser number of extruder dies can be used to accommodate the braid diameter while still maintaining an effective throughput rate when a number of dies are used in combination or series along an extruder face.

Figure 5:
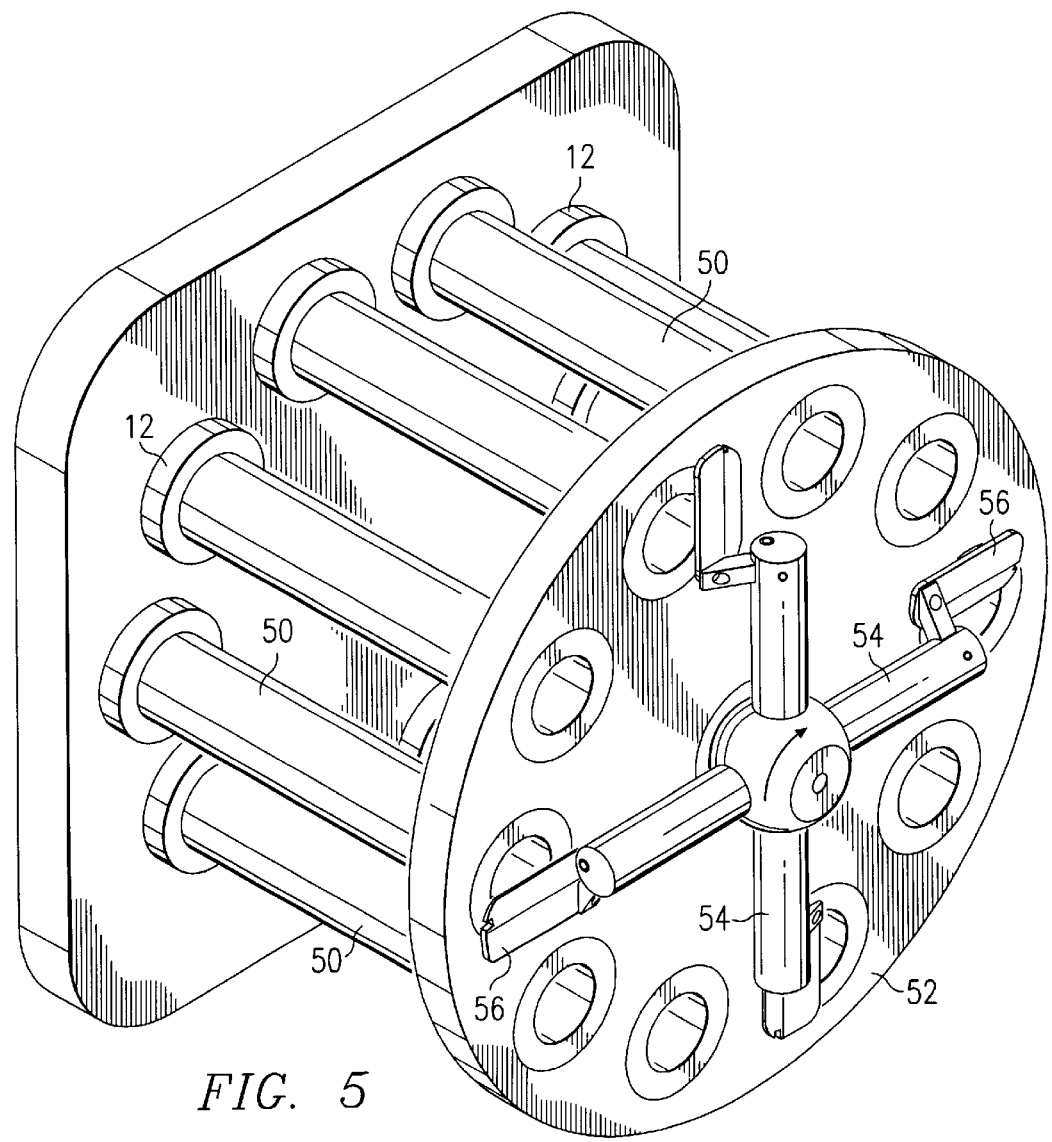
FIG. 5 is a perspective view in elevation of an embodiment of the invention incorporated into a multiple die and circular face cutting arrangement.

FIG. 5 illustrates a perspective view of one embodiment of the invention involving a number of dies 12 in series attached to a number of containment tubes 50. The exit end of each containment tube 50 is attached to an extruder face 52. This arrangement then permits the attachment to the extruder face of a circular cutting apparatus 54 having a number of individual cutting blades 56. Such an arrangement is shown with ten individual extruder dies 12 connected to ten containment tubes 50, and permits overall throughput rates through the extruder equal to the throughput rates previously described for prior art puffed rod production using the methods described above.

Although not shown in FIG. 5, the containment tube 50 and extruder face 52 configuration can be designed such that the dies 12 are allowed to vent until specific conditions are met (such as extrudate bulk density, specific mechanical energy, moisture content, screw speed, and die pressure), then the containment tube 50 can be rotated over the dies 12 by means of an additional rotatable plate (not shown) between the tubes 50 and the dies 12.

It should further be understood that dies producing any number of shapes, such as a star or square cross section or more complex shapes, such as a cactus or pepper shape, can be used with the invention.

Any number of various types of extruders can be used with the invention, including twin screw and single screw extruders of any length and operating at a wide range of rpm. Further, while the process has been described with regard to a corn-based product, it should be understood that the invention can be used with any puffed extrudate, including products based primarily on wheat, rice, or other typical protein sources or mixes thereof. In fact, the invention could have applications in any field involving extrusion of a material that quickly goes through a glass transition stage after being extruded through a die orifice.

While the invention has been particularly shown and described with reference to a preferred embodiment, it will be understood by those skilled in the art that various changes in form and detail may be made therein without departing from the spirit and scope of the invention.

What is claimed is:

1. A method for producing a braided puff extrudate, said extrudate exiting at least two die orifices in a plastic melt stage and thereafter cooling to a glass transition stage, comprising applying a circular gas flow, sufficient to cause said extrudate exiting said at least two die orifices to braid with each other, said gas flow being applied around the extrudate downstream of the glass transition stage while such extrudate is contained in a peripheral containment vessel.

2. The method of claim 1 wherein the peripheral containment vessel comprises a tube.

3. The method of claim 1 wherein the circular gas flow is applied to the extrudate by means of at least one gas port through said containment vessel.

4. The method of claim 1 wherein the circular gas flow is applied to the extrudate by introducing a pressurized gas into the peripheral containment vessel.

5. The method of claim 1 wherein the circular gas flow is applied to the extrudate by a vacuum created within the peripheral containment vessel.

6. The method of claim 1 further comprising placing a number of extruder dies and corresponding peripheral containment vessels in series such that an extruder face can be attached to an exit end of the extruder dies.

7. The method of claim 1 wherein the peripheral containment vessel is generally axially oriented in relation to the extrudate flow.

8. An apparatus for producing a braided extrudate for an extrudate having a glass transition point, said apparatus comprising:

an extruder die;

a peripheral containment vessel attached to said die; and a means for subjecting at least two parallel extrudate streams exiting from said die to a circular gas flow, wherein such circular gas flow is applied downstream of the glass transition point of the extrudate, thereby causing the extrudate streams to braid inside said peripheral containment vessel.

9. The apparatus of claim 8 wherein the peripheral containment vessel comprises a tube.

10. The apparatus of claim 8 wherein the peripheral containment vessel is generally axially oriented in relation to the extrudate stream flow.

11. The apparatus of claim 8 wherein the means for subjecting said extrudate streams to a circular gas flow comprises the introduction of a pressurized gas into the peripheral containment vessel through at least one port through said containment vessel.

12. The apparatus of claim 8 wherein the means for subjecting said extrudate streams to a circular gas flow comprises creating a vacuum within the peripheral containment vessel through at least one port through said containment vessel.

13. The apparatus of claim 8 further comprising:

an extruder die face attached to an exit end of a peripheral containment vessel; and a circular die cutting device attached to said extruder face.

14. A method for producing a braided shaped puffed extrudate, said extrudate exiting in at least two streams from an extruder die in a plastic melt state before cooling to a glass transition state, said method comprising the steps of:

a) routing the extrudate streams through a peripheral containment vessel;

b) applying a circular air flow within the peripheral containment vessel, said circular air, flow applied downstream of the extrudate glass transition state, wherein such circular air flow is sufficient to cause the extrudate streams to braid with each other within the peripheral containment vessel.

15. The method of claim 14 wherein more than two extrudate streams are routed through a single peripheral containment vessel.

16. The method of claim 14 wherein the peripheral containment vessel comprises a tube.

17. The method of claim 14 wherein the circular air flow within the peripheral containment vessel is applied by means one or more ports through the peripheral containment vessel.

18. The method of claim 14 wherein the circular air flow within the peripheral containment vessel is applied by introducing a pressurized gas into the peripheral containment vessel.

19. The method of claim 14 wherein the circular air flow within the peripheral containment vessel is applied by a vacuum created within the peripheral containment vessel.

20. The method of claim 14 wherein the peripheral containment vessel is generally axially oriented in relation to the extrudate stream flow.

* * * * *

UNITED STATES PATENT AND TRADEMARK OFFICE
CERTIFICATE OF CORRECTION

PATENT NO.   : 6,607,772 B1
DATED        : August 19, 2003
INVENTOR(S)  : Bortone It is certified that error appears in the above-identified patent and that said Letters Patent is hereby corrected as shown below:

Column 8,
Line 4, delete "air, flow" and insert -- air flow --

Signed and Sealed this

Fourteenth Day of October, 2003

JAMES E. ROGAN
*Director of the United States Patent and Trademark Office*